(12) United States Patent
Sherman et al.

(10) Patent No.: US 6,655,641 B2
(45) Date of Patent: Dec. 2, 2003

(54) SYSTEM FOR SUPPORTING SUBSTANTIALLY RIGID LINEAR STRUCTURES

(76) Inventors: Yury Sherman, 511 Beech St., Roslindale, MA (US) 02131; Mark Yankelevich, 270 Babcock St., Apt. 11C, Boston, MA (US) 02213

(*) Notice: Subject to any disclaimer, the term of this patent is extended or adjusted under 35 U.S.C. 154(b) by 0 days.

(21) Appl. No.: 10/149,308
(22) PCT Filed: Dec. 14, 2000
(86) PCT No.: PCT/US00/34019

§ 371 (c)(1),
(2), (4) Date: Jun. 10, 2002

(87) PCT Pub. No.: WO01/44622

PCT Pub. Date: Jun. 21, 2001

(65) Prior Publication Data

US 2003/0000414 A1 Jan. 2, 2003

Related U.S. Application Data

(63) Continuation of application No. 09/460,502, filed on Dec. 14, 1999, now abandoned.

(51) Int. Cl.[7] ................. E01B 25/22; B61B 3/02; F16L 3/00
(52) U.S. Cl. ................. 248/58; 104/123; 104/124
(58) Field of Search ............... 248/49, 58, 59, 248/60, 61, 328, 353, 901; 138/107; 104/123, 124, 180; 14/18, 21

(56) References Cited

U.S. PATENT DOCUMENTS

| | | | | |
|---|---|---|---|---|
| 3,776,141 A | * | 12/1973 | Gelhard et al. | 104/123 |
| 4,069,765 A | * | 1/1978 | Muller | 104/123 |
| 4,208,969 A | * | 6/1980 | Baltensperger et al. | 104/111 |
| 5,226,456 A | * | 7/1993 | Semak | 138/107 |
| 5,655,457 A | * | 8/1997 | Sherman et al. | 104/123 |

* cited by examiner

*Primary Examiner*—Ramon O. Ramirez
*Assistant Examiner*—Jon Szumny
(74) *Attorney, Agent, or Firm*—John H. Crozier

(57) ABSTRACT

A suspended supporting system for supporting a substantially rigid linear structure (2) such as a pipeline, a tramway, a walkway bridge, a transportation gallery, an underwater tunnel, etc. placed above the ground/seabed/riverbed, the system including: apparatus (1) attached to the linear structure, pulling the linear structure upward, generating upward vertical force of magnitude great enough for carrying downward vertical loads and lateral loads applied to the linear structure; and at least two guy ropes (5) placed at an angle with each other, upper ends of which are attached to the linear structure and lower ends of which are attached to a footing structure (7) placed on or anchored in the ground/seabed/riverbed.

12 Claims, 4 Drawing Sheets

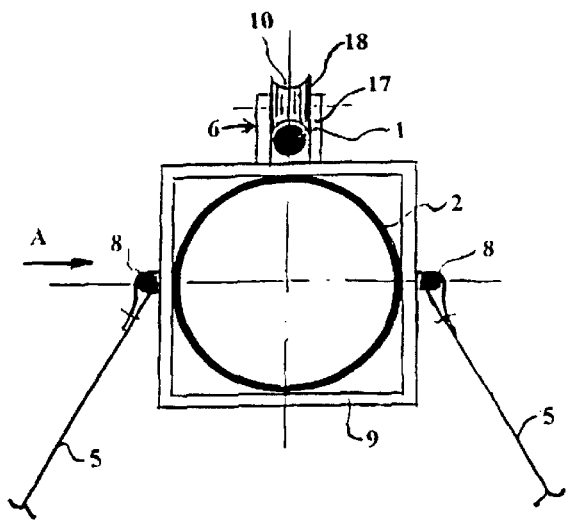
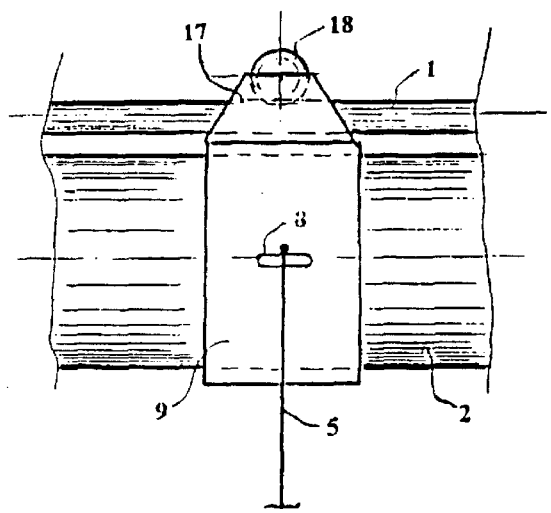
Fig. 3
Fig. 4
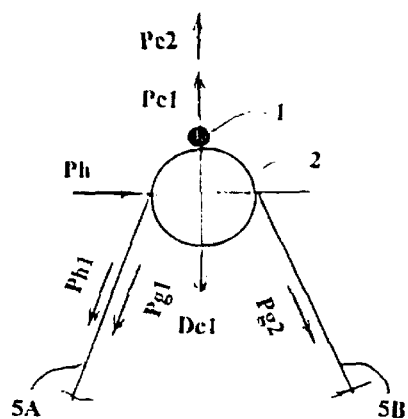
Fig. 5

SYSTEM FOR SUPPORTING SUBSTANTIALLY RIGID LINEAR STRUCTURES

The present application is a 35 USC 371 of International Application No. PCT/US00/34019, filed Dec. 14, 1999, and titled SYSTEM FOR SUPPORTING SUBSTANTIALLY RIGID LINEAR STRUCTURES.

TECHNICAL FIELD

The present invention relates to supporting structures generally and, more particularly, to a novel suspending supporting structure for supporting substantially rigid linear structures such as pipelines, tramways, walkway bridges, transportation galleries, underwater tunnels, etc placed above a surface.

BACKGROUND ART

While the present invention is described in detail with reference to the support of pipelines, it will be understood that it is application as well to the support of other substantially rigid linear structures such as pipelines, tramways, walkway bridges, transportation galleries, underwater tunnels, and etc.

Design and construction of supports for linear structures such as pipelines, tramways, walkway bridges, transportation galleries, underwater tunnels, etc. placed in complex terrain, or underwater, or in ecologically sensitive areas with long-term recovery of soils destroyed by construction activities, have a long term experience.

Depending on the linear structure, different types of supports are currently in use. For example, aerial and underwater pipelines are placed mostly in trenches dug in the ground and then backfilled, sleepers placed upon the ground, or tower supports. Tramways and walkway bridges, as well as transportation galleries, are usually supported by towers or by suspended long-span cable systems.

However all these types of supports have significant drawbacks under the above conditions.

For example, feasibility and cost effectiveness of placing of the pipelines underground or supporting them by sleepers strongly depends on ground conditions: hardness and roughness of the ground. For many cases of irregular terrain, using these supports is completely impossible. Similar restrictions exist for using tower supports. Placed across mountainous areas with steep slopes and high peaks, they are ineffective because their heights are significantly higher than the cost effectiveness limits (approx. 100–150 ft). Practically, designers prefer to bypass such areas even though it increases the lengths of the linear structures and accordingly, their costs. Both, sleepers and towers are highly vulnerable to natural disasters such as snowfalls, landslides, earthquakes, etc., typical occurrences in mountainous areas.

The suspended systems are more suitable for complex terrain but they are used rarely. The main problem of these structures is that the main carrying cable and the suspended linear structures have low lateral stiffness and are subjected to large displacements and rocking under the lateral loads, mostly wind. To increase the stiffness, traditional suspended systems include special structures such as horizontal frames or a number of horizontally interconnected cables, or the like. See U.S. Pat. Nos. 3,604,361 and 3,745,601. As a result, suspended supporting systems usually fail cost competition with sleepers and tower supports An effective system of suspended supports for aerial transportation means, such as ski lifts, aerial tramways, freight ropeways, etc is described in U.S. Pat. No. 5,655,457. The system described therein includes a long-span cable suspended at its ends and placed along the transportation route A number of spaced apart supports for the aerial means are hung from the cable. Each support has a rigid element supporting the transportation means carried by the cable and guy ropes, one end of which is attached to the rigid element and another end is anchored in the ground and tensioned. The guy ropes carry lateral loads applied to the rigid-elements. No additional structures increasing the lateral stiffness of the system are required. The system is very effective for aerial transportation means; however, for carrying linear structures it has to be essentially modified.

Accordingly, an object of the present invention is to provide a suspended supporting system for linear structures such as pipelines, tramways, walkway bridges, transportation galleries, underwater tunnels, etc, providing lateral stability of the structures by segmenting them and thus, decreasing their free spans in horizontal plane. The most effective areas of application of the system are complex terrain and underwater conditions, as well as ecologically sensitive areas with long-term recovery of soils destroyed by construction activities

DISCLOSURE OF INVENTION

A suspended supporting system for supporting a substantially rigid linear structure such as a pipeline, a tramway, a walkway bridge, a transportation gallery, an underwater tunnel, etc. placed above ground/seabed/riverbed, said system comprising means attached to said linear structure, pulling said linear structure upward, generating upward vertical force of magnitude great enough for carrying downward vertical loads and lateral loads applied to the said linear structure, and at least two guy ropes placed at angle with each other, upper ends of which are attached to said linear structure and lower ends of which are attached to a footing structure placed on or anchored in said ground/seabed/riverbed.

BRIEF DESCRIPTION OF DRAWINGS

FIG. 3 is a cross-sectional view of the pipeline in connection with the cable and the guy ropes FIG. 4 is a side elevational view of the elements of FIG. 3

FIG. 5 is a diagram of forces applied to system at a point the guy rope support is installed, wherein $P_c$ is a vertical resultant force including pre-tensioning, force $P_{c1}$ and gravity load $P_{c2}$ applied to the cable, $D_{c1}$ is a balancing downward loads, $P_{g1}$, $P_{g2}$ are tensile forces in the guy ropes; and $P_h$ is the lateral load applied to the system (mostly wind), which produces reaction component $P_{h1}$, in one of the guy ropes.

BEST MODE FOR CARRYING OUT THE INVENTION

The major goal of this invention is the development of a suspended supporting system for substantially rigid linear structures such as pipelines, tramways, walkway bridges, transportation galleries, underwater tunnels, etc. which provides lateral stability of the linear structures by segmenting them and, thus, decreasing their free spans in the horizontal plane.

Figure 1:
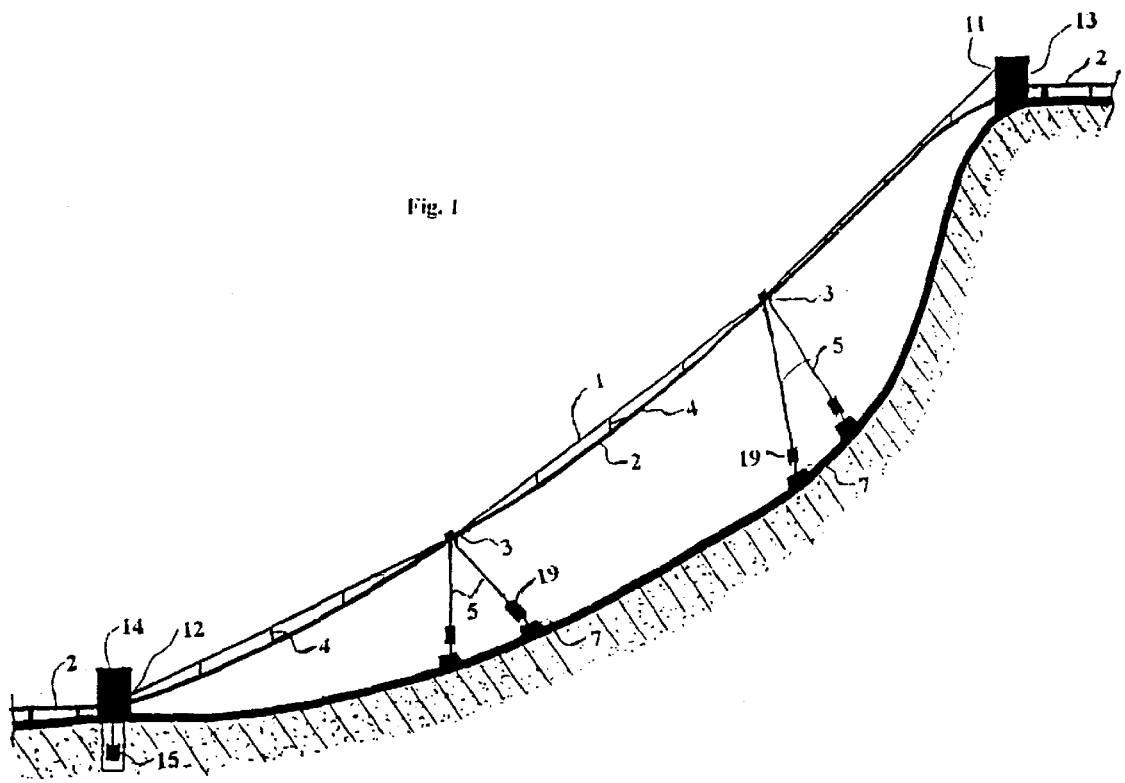
FIG. 1 is a side elevational view of the structural elements of a suspended supporting system shown supporting a pipeline.
Figure 2:
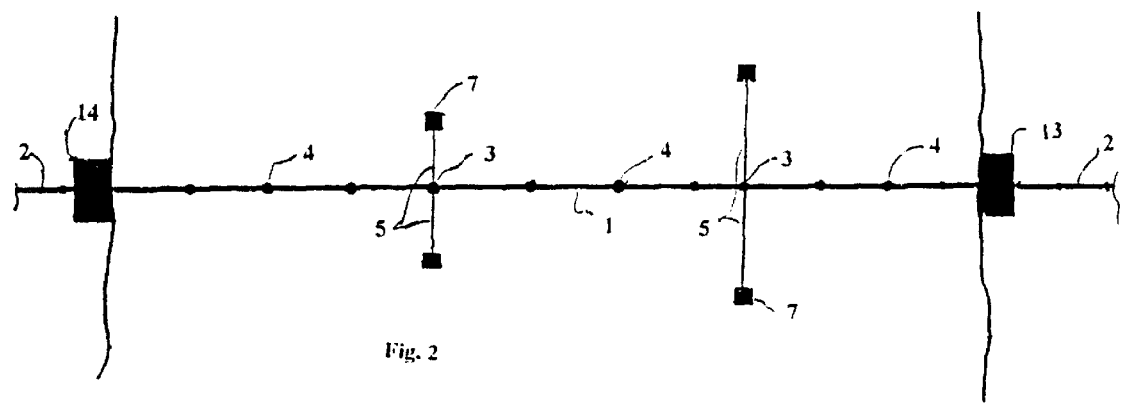
FIG. 2 is a top view of the system of FIG 1.

A description of the invention is made with two examples, pipelines placed in mountainous terrain and underwater Referring to the drawings in more detail, in FIGS. 1 and 2, a suspended supporting system, according to the present invention, for an aerial pipeline placed across a steep slope is shown.

The main carrying element of the supporting system is a cable 1 suspended above the ground. The cable is placed alone the route of the aerial pipeline 2 One cable carries one pipeline placed below and coincident with cable 1. End 11 of cable 1 is anchored in a supporting station 13 and end 12 is attached to a tensioning means 15 of a supporting station 14 as is shown or both ends of the cable may be anchored depending on the forces involved. As the tensioning means 15 different pulling mechanisms can be used, for example, a balance weight 15 as it is schematically shown in FIG. 1 may be used. Tensioning of the cable generates upward forces applied to the pipeline. Due to these forces, the cable 1 carries the downward loads, mostly weight of pipeline 2 and the product transported therein. However, these upward forces, as it is described below, have to exceed the forces necessary to carry the downward loads because they also have to balance the pre-tensioning, forces in guy ropes 5 that carry the lateral loads applied to the linear structure.

Pipeline 2 is hung from the cable 1 by using a number of pipeline supports 3 and 4 placed along cable 1.

As best seen by reference also to FIG. 3, supports 3 carry the lateral loads applied to pipeline 2 and transfer the downward vertical loads from the pipeline to cable 1. Each of the supports 3 includes a saddle 6 attached the pipeline 2 hung from cable 1, and two guy ropes 5 having upper ends attached to the pipeline and lower ends to footings, as at 7 (FIGS. 1,2)

Saddle 6 provides a sliding contact between cable 1 and pipeline 2 in case of elongation, for example temperature elongation, of the cable. The sliding contact is necessary to avoid additional loading caused by elongation of the cable, applied to the guy ropes of the supports 3 and/or to the expansion joints of pipeline 2 (expansion joints not shown)

Saddle 6 may be of different design. In the preferred embodiment shown in FIGS. 3 and 4, saddle 6 includes housing 17 attached to a bandage 9 embracing pipeline 2. A part of saddle 6 contacting the cable is a track wheel 18 with a grooved rim 10 placed over the cable 1. When cable 1 moves about the pipeline because of elongation of the cable, track wheel 18 rolls along the cable and, thus, practically no additional load is generated Connection of guy ropes 5 with pipeline 2 may be of different design. In the preferred embodiment, they are attached to extensions 8 of bandage 9.

Supports 3 carry the lateral loads, mostly wind loads, applied to pipeline 2 and provide lateral stability of the pipeline in the manner described below. As is shown in FIG. 5, the upward force induced by tensioning of cable 1 is equal to the force $P_{c1}$ balancing downward loads $D_{c1}$ that is the weight of the structure and live loads applied to the pipeline, and the force $P_{c2}$ that produces tension forces $P_{g1}=P_{g2}$ in guy ropes 5A and 5B. As it is also shown, the lateral load $P_h$ additionally tensions guy rope 5A by the force $P_{h1}$ When the forces $P_{c2}$, $P_h$ and $P_{g1}+P_{h1}$ are balanced, the position of pipeline 2 at the point where the supports 3 are attached is stable. In case of opposite direction of the lateral loads, the system works symmetrically. This means that pipeline 2 is supported in the horizontal plane at these points and works similar to a continuous beam. The greater the number of supports 3 that are installed, the less the lateral displacements of pipeline 2. At the same time, due to perfect aerodynamic characteristics of the system, which is practically transparent for the wind, the lateral loads applied to the pipeline are minimal.

To reduce displacements of supports 3 caused by temperature elongation of pipeline 2, the supports should be placed in the middle of pipeline sections between two expansion joints. In these case position of the supports 3 along the pipeline is practically unchangeable at any elongation of the pipeline and accordingly, no additional loads will be applied to the guy ropes. In cases where the supports 3 cannot be placed in the middle of the pipeline sections, their upper ends can be displaced significantly along pipeline 2 that will overload guy ropes 5 In these cases, if it is necessary, a special means providing expansion of guy ropes 5 will have to be connected thereto. As for such a means, different mechanisms can be used, for example, springs that can be also used for damping possible vibrations of guy ropes 5. This means allows elongation of the guy rope and provides its tensioning under the longitudinal displacements.

Lengths of supports 3 determine profile of pipeline 2. After pipeline 2 is mounted upon the cable 1, guy ropes 5 are pulled down until the pipeline reaches the designed altitude above the ground at each point where the supports 3 are attached. To adjust the pipeline profile, guy ropes 5 are supplied with length adjusting devices, at 19. Length adjusting devices 19 may, for example, be turnbuckles that are schematically shown in FIG. 1.

Figure 7:
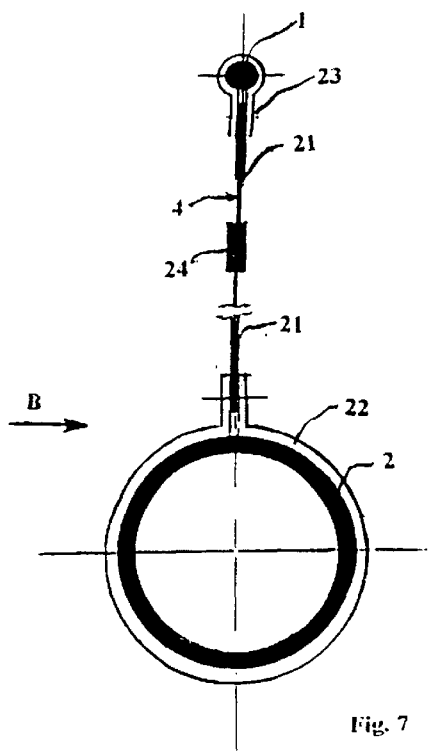
FIG. 7 is a cross-sectional view of the hanger supporting the pipeline
Figure 8:
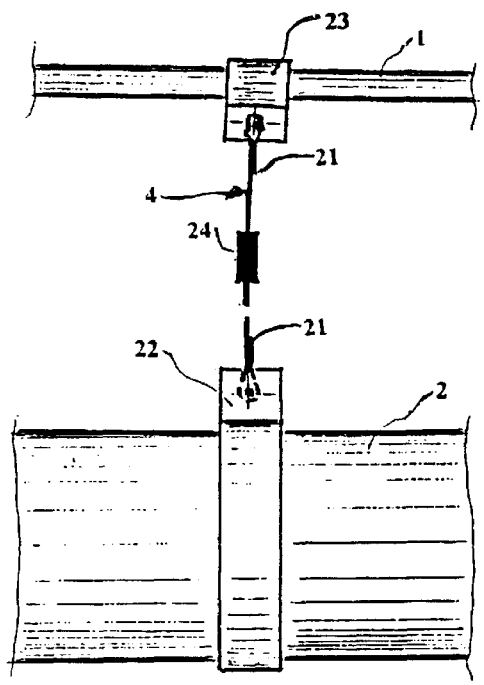
FIG. 8 is a side elevational view of the hanger.
Figure 6:
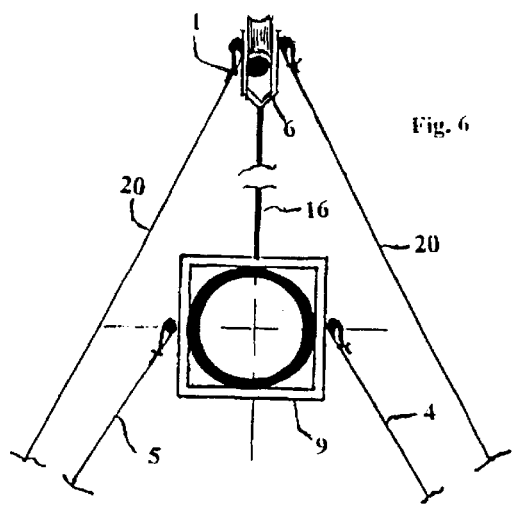
FIG. 6 is a cross-sectional scheme of the guy rope support hung from a carrying cable with a hanger

Depending on the profile of cable 1 and pipeline 2, guy rope supports 3 can also include a hanger 16 placed between the saddle 6 and the bandage 9 as it is shown in FIG. 6. Hanger 16 can be flexible or rigid. Depending on length of hanger 16, additional guy ropes 20 connecting the cable 1 with foundations 7 could be installed to reduce lateral displacements of cable 1, the foundations being placed on or formed in ground/seabed/river bed Usually, an allowable free span of the cable in the horizontal plane is longer than those in the vertical plane. In these cases, the system includes also supports 4 placed between supports 3 (FIG. 1) The supports 4 (FIGS. 7 and 8) transfer weight of pipeline 2 and the product transported therein to cable 1 as well as smooth the curvature of the profile of pipeline 2 They consist of a bandage 22 embracing pipeline 2, a hanger 21 connecting pipeline 2 to cable 1 and a hanger supporting means 23 providing connection between the hanger and the cable. The means 23 can be of different design, for example as is shown in the preferred embodiment or similar to saddle 6 described above A means 24 is included for adjusting the lengths of hangers 21

Erection of the system is performed by the following steps.

1) The carrying cable 1 is installed between its supports 3 One end 11 is anchored and the other end 12 is attached to tensioning means 15.
2) Part of the designed tensioning load necessary for stretching cable loaded by empty pipeline 2 is applied to the cable by tensioning means 15.
3) Pipeline 2 is welded, isolated, and equipped with supports 3 and 4 on special facilities placed next to one, preferably elevated, cable supports 13 or 14
4) Pipeline 2 is erected by using cable 1 as a ropeway. Pipeline 2 is hung from and is rolled along cable 1. As a rolling means, roller saddles 18 of the supports 3 (and 4 if necessary) are used. A simple mechanism, such as a winch, is required for transportation of pipeline 2 along cable 1 in its designed position 5) When pipeline 2 reaches the designed position, guy ropes 5 of supports 3 are lowered to the round and attached to previously built footings 7. Then, guy ropes 5 are pulled down until the projected pipeline profile is formed 6) The tension of cable 1 is increased until required tension force is reached. Then, lengths of the guy ropes 5 are adjusted, if necessary.

Figure 9:
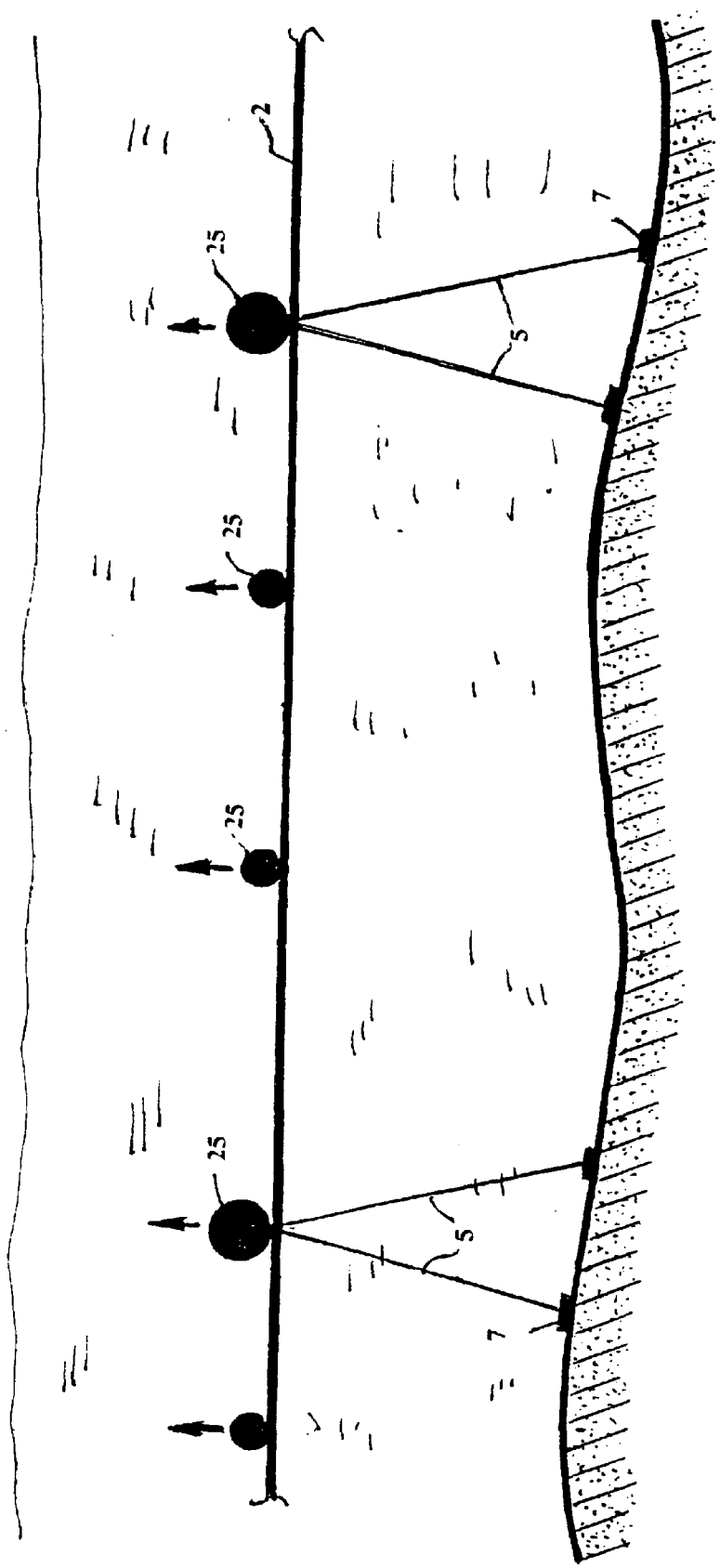
FIG. 9 is a side elevational view of a suspended supporting system supporting an underwater pipeline over the seabed.

The second version of the present invention is a modification of the system for its usage as a support for underwater pipelines. A structure of such a system is shown in FIG. 9 Structurally, the system is rather close to that shown in FIGS. 1 and 2. The main difference is that upward forces applied to the pipeline are generated by buoyancy floats 25 instead of cable 1. Floats 25 attached to pipeline 2 substitute also for hanger supports 4. Floats 25 can be placed above pipeline 2 as it is shown in FIG. 9, or under the pipeline. In the first case, floats 25 can be set directly over or distantly from pipeline 2. In the latter case, floats 25 are connected to pipeline 2 by hangers. As a float 25, an empty metal or plastic sphere, balls made of light materials, or a collar spread along pipeline 2 made of a low density material can be used. The upper ends of the guy ropes 5 are attached to pipeline 2, preferably at the same place where the floats are connected, and their lower ands are attached to footings 7 The main function of guy ropes 5 is to carry the lateral loads applied to pipeline 2 caused by underwater currents.

Still another version of the system covers cases when buoyancy force of the underwater pipeline itself (FIG. 9) is larger than upward force required for the supporting system attached to the pipelines for example, in case of gas pipelines of large diameter. The only difference between this and the second version is that buoyancy floats 25 are eliminated This invention is not limited to the details shown since various modifications and structural changes are possible without departing in any way from the spirit of the present invention. What is desired to be protected is set forth in particular in the appended claims.

What is claimed is:

1. A suspended supporting system and a substantially linear structure said system supporting said substantially linear structure, said structure being a pipeline, a tramway, a walkway bridge, a transportation gallery, or underwater tunnel, placed above a surface such as ground or seabed or riverbed, comprising:

(a) said substantially linear structure is substantially rigid and has a length substantially greater than a width thereof;

(b) means having a major axis generally parallel to a major axis of said substantially linear structure moveably attached to said substantially linear structure pulling said substantially linear structure upward, generating upward vertical force of magnitude great enough for carrying downward vertical loads and lateral loads applied to said substantially rigid structure; and (c) at least two guy ropes placed at an angle with each other, upper ends of which are attached to said linear structure and lower ends of which are attached to a footing structure placed on or anchored in said surface.

2. The suspended supporting system according to claim 1, including also at least one hanger hung from said means having a major axis, placed along said linear structure between adjacent pairs of said guy ropes or between one of said pairs of said guy ropes and a cable support attached to said linear structure.

3. The suspended supporting system according to claim 2, wherein said hanger includes means for adjusting its length.

4. The suspended supporting system according to claim 1, wherein said means pulling said linear structure upward is a suspended carrying cable placed above said linear structure along its trace, having one end anchored and another end attached to a means for tensioning said carrying cable.

5. The suspended supporting system according to claim 4, wherein said means for tensioning said carrying cable provides substantially permanent tension stress of said cable of a predetermined magnitude.

6. The suspended supporting system according to claim 5, wherein said predetermined magnitude of tensioning said carrying cable is selectively changeable.

7. The suspended supporting system according to claim 5, wherein said linear structure is hung from said carrying cable by using one or more saddles moveable along said carrying cable such that a sliding contact between said linear structure and said carrying cable during an elongation of said carrying cable is provided.

8. The suspended supporting system according to claim 7, wherein said linear structure is hung from said carrying cable by using a hanger attached to said saddle and said linear structure.

9. The suspended supporting system according to claim 8, wherein said hanger includes means for adjusting its length.

10. The suspended supporting system according to claim 1, wherein said means pulling said linear structure upward is a suspended carrying cable placed above said linear structure along its trace, having both ends anchored.

11. The suspended supporting system according to claim 10, wherein said at least two guy ropes include expansion means which allow elongation of said at least two guy ropes and provide their tensioning under longitudinal displacements of said linear structure.

12. The suspended supporting system according to claim 1, wherein said guy ropes include means for adjusting their length.

* * * * *